United States Patent [19]

Terry et al.

[11] Patent Number: 5,428,117
[45] Date of Patent: Jun. 27, 1995

[54] TREATMENT FOR IMPARTING STAIN RESISTANCE TO POLYAMIDE SUBSTRATES AND RESULTING STAIN RESISTANT MATERIALS

[75] Inventors: Mark E. Terry, Rockmart; Mahfooz Ahmad, Kennesaw, both of Ga.

[73] Assignee: Interface, Inc., LaGrange, Ga.

[21] Appl. No.: 138,807

[22] Filed: Oct. 18, 1993

[51] Int. Cl.$^6$ .................. C08L 61/06; C08L 61/14
[52] U.S. Cl. .................. 525/505; 525/501.5; 525/508; 525/133.5; 525/134; 525/136; 525/150
[58] Field of Search .................. 525/501.5, 502, 505, 525/508, 133.5, 134, 136, 143, 150

[56] References Cited

U.S. PATENT DOCUMENTS

| | | | |
|---|---|---|---|
| 1,901,536 | 3/1933 | Shäfer | 260/49 |
| 2,171,806 | 9/1939 | Russel et al. | 260/49 |
| 2,205,883 | 6/1940 | Graves | 149/5 |
| 3,408,319 | 10/1968 | Rau | 260/23 |
| 3,961,881 | 6/1976 | Sumner et al. | 8/17 |
| 3,994,744 | 11/1976 | Anderle et al. | 134/4 |
| 4,081,383 | 3/1978 | Warburton, Jr. et al. | 252/8.6 |
| 4,203,859 | 5/1980 | Kirn et al. | 252/174.23 |
| 4,260,389 | 4/1981 | Lister | 8/491.1 |
| 4,334,876 | 6/1982 | Beier et al. | 8/94.19 |
| 4,388,372 | 6/1983 | Champaneria et al. | 428/395 |
| 4,439,201 | 3/1984 | Lauton et al. | 8/436 |
| 4,448,839 | 5/1984 | Morris | 428/267 |
| 4,501,591 | 2/1985 | Ucci et al. | 8/495 |
| 4,507,324 | 5/1985 | Olive et al. | 428/375 |
| 4,526,581 | 7/1985 | Prentiss et al. | 8/94.33 |
| 4,579,762 | 4/1986 | Ucci | 428/95 |
| 4,592,940 | 6/1986 | Blythe et al. | 428/96 |
| 4,680,212 | 7/1987 | Blythe et al. | 428/97 |
| 4,699,812 | 10/1987 | Munk et al. | 427/393.4 |
| 4,822,373 | 4/1989 | Olson et al. | 8/115.6 |
| 4,839,212 | 6/1989 | Blythe et al. | 428/96 |
| 4,883,839 | 11/1989 | Fitzgerald et al. | 525/136 |
| 4,937,123 | 6/1990 | Chang et al. | 428/96 |
| 4,940,757 | 7/1990 | Moss, III et al. | 525/502 |
| 4,948,650 | 8/1990 | Fitzgerald et al. | 428/96 |
| 5,015,259 | 5/1991 | Moss, III et al. | 8/115.6 |
| 5,061,763 | 10/1991 | Moss, III et al. | 525/502 |
| 5,073,442 | 12/1991 | Knowlton et al. | 428/267 |
| 5,074,883 | 12/1991 | Wang | 8/115.6 |

FOREIGN PATENT DOCUMENTS 0235980 9/1987 United Kingdom.
0235989 9/1987 United Kingdom.

OTHER PUBLICATIONS

Gilbert, *Sulfonation and Related Reactions,* Interscience Monograms on Chemistry (Jan. 1965), pp. 374–383.
Knop, *Phenolic Resins* Jan. 1985, pp. 46–47.
*Concise Chemical and Technical Dictionary,* Chemical Publishing Co., Inc., N.Y., 1947, p. 395.

*Primary Examiner*—W. Robinson Clark
*Attorney, Agent, or Firm*—Jones & Askew

[57] ABSTRACT

A composition for imparting stain resistance to polyamide substrates comprising a sulfonated fatty composition and sulfonated hydroxyaromatic formaldehyde condensation polymer. A method for making the stain treatment composition, a method for treating polyamide substrates with the composition, and the resulting stain resistant polyamide materials are also disclosed. Suitable sulfonated hydroxyaromatic formaldehyde condensation polymers include sulfonated phenol formaldehyde condensation polymer and sulfonated dihydroxy diphenyl formaldehyde condensate polymer. Suitable sulfonated fatty compositions include sulfonated oleic acid and marine oil.

15 Claims, No Drawings

TREATMENT FOR IMPARTING STAIN RESISTANCE TO POLYAMIDE SUBSTRATES AND RESULTING STAIN RESISTANT MATERIALS

TECHNICAL FIELD

This invention relates to the treatment of substrates comprising polyamide linkages to impart stain resistance, and in particular relates to stain resistant polyamide fibers and carpets.

BACKGROUND OF THE INVENTION

Polyamide materials are widely used commercially. Polyamide linkages are found in a wide variety of fibers and fabrics, such as wool, silk, natural leather, synthetic leather, and nylon. Wool is composed primarily of alpha-keratin, a naturally occurring alpha-helical fibrous protein. Silk is composed primarily of beta-keratin, a naturally occurring fibrous protein existing in a zig-zag structure. Leather is almost pure collagen, a fibrous protein composed primarily of glycine, alanine, proline and 4-hydroxyproline, forming a 3-strand helical structure. Nylon is a synthetic polyamide prepared by the polycondensation of a dicarboxylic acid and diamine, such as adipic acid and hexamethylene diamine (nylon 6,6). Nylon is also produced from a cyclic amide such as caprolactam (nylon 6). Nylon fiber is widely used to made textiles, and in particular, is used to make a substantial amount of the world's carpet.

Although polyamide materials have favorable attributes which make polyamide materials desirable for many applications, one disadvantage is that polyamide materials are easily stained. Fluorochemical coatings have been developed for imparting stain resistance to polyamide fiber carpets. Fluorochemicals used to impart stain resistance typically contain a perfluoroalkyl radical having 3–20 carbons, and are produced by condensation of a fluorinated alcohol or fluorinated primary amine with a suitable anhydride or isocyanate. For example, N-ethyl perfluorooctyl-sulfonamidoethanol and toluene diisocyanate can be reacted in a 2:1 molar ratio to produce a stain resistant fluorochemical. Fluorochemical coatings resist wetting of the carpet surface and minimize chemical contact between the carpet surface and staining materials and also provide a physical barrier to the staining material. Although fluorochemical coatings are effective in protecting polyamide materials from being stained by certain materials such as soil, fluorochemical coatings are not particularly effective to prevent staining by acid dyes which are found in substances such as mustard, wine, coffee, and soft drinks. FD&C red dye number 40 is an acid dye found in many food and drink products and is a common cause of carpet staining. Acid dyes stain polyamide materials such as nylon fibers by forming ionic bonds with protonated terminal amine groups on the polyamide material surface.

A conventional treatment for increasing the resistance of polyamide materials from staining by acid dyes has been to coat the polyamide materials with a sulfonated hydroxyaromatic formaldehyde condensation polymer. Such polymers include sulfonated phenol formaldehyde condensate polymer and sulfonated dihydroxy diphenyl sulfone formaldehyde condensation polymer. These materials provide stain resistance by bonding to the surface of the polyamide materials. The sulfonate groups of the sulfonated hydroxyaromatic formaldehyde condensation polymers bond to available protonated amino groups on the polyamide material surface thereby preventing the protonated amino groups from bonding to acid dyes.

Although sulfonated hydroxyaromatic formaldehyde condensation polymers are effective stain resistant treatments, one drawback is that such coatings discolor over time by gradually turning yellow when exposed to ultraviolet light or nitrogen dioxide. This is a particularly serious problem when such materials are used on light-shaded textile articles.

Therefore, there is a need for a stain resistant treatment for polyamide materials that is effective to prevent staining by acid dyes and does not yellow overtime.

SUMMARY OF THE INVENTION

Accordingly, an object of the present invention is to provide an improved treatment which imparts stain resistance to substrates containing polyamide linkages.

Another object of the present invention is to provide a nonyellowing stain resistant treatment for substrates containing polyamide linkages.

A further object of the present invention is to provide stain resistant materials containing polyamide linkages such as stain resistant polyamide fibers, yarns, and carpets.

Therefore, the present invention provides a composition that, when applied to substrates containing polyamide linkages, imparts resistance to staining by acid dyes and does not yellow when exposed to ultraviolet light or nitrogen dioxide. The present invention also encompasses a method for making this stain resistant composition, a method for treating substrates containing polyamide linkages with this composition, and substrates treated with this composition.

Generally described, the composition of the present invention for providing stain resistance comprises sulfonated hydroxyaromatic formaldehyde condensation polymer and a sulfonated fatty composition comprising a sulfonated fatty compound including a sulfonated fatty group, the sulfonated fatty group having a carbon chain length of at least $C_{12}$. When used alone, sulfonated fatty compositions do not yellow when exposed to ultraviolet light or nitrogen dioxide, but also do not provide enough stain resistance for most applications. Sulfonated hydroxyaromatic formaldehyde condensation polymers, when used alone, provide a high level of stain resistance but tend to yellow when exposed to ultraviolet light or nitrogen dioxide, and thus are inadequate for many applications. However, when these two components are combined, the composition provides a high level of stain resistance to stains such as acid dyes and resists yellowing when exposed to ultraviolet light or nitrogen dioxide. Preferably, the sulfonated hydroxyaromatic formaldehyde condensation polymer is present in the composition in an amount from about 0.5 to about 5 pans by weight per 20 pans by weight of sulfonated fatty compound. Furthermore, the sulfonated fatty compound is preferably polymerized.

Suitable sulfonated hydroxyaromatic formaldehyde condensation polymers include sulfonated phenol formaldehyde condensation polymer and sulfonated dihydroxy diphenyl sulfone formaldehyde condensation polymer. Suitable sulfonated fatty compounds include sulfonated fatty acids and sulfonated triglycerides. Suitable sulfonated fatty acids include sulfonated oleic acid and suitable sulfonated triglycerides can be found in sulfonated marine oil polymer. Sulfonated marine oils include sulfonated cod liver oil, menhaden oil, porpoise oil, sperm oil and whale oil. Preferably, the composition includes water, and the sulfonated fatty composition and sulfonated hydroxyaromatic formaldehyde condensation polymer are emulsified in the water. The composition also preferably includes an emulsifying agent such as coco-dimethylamido propyl betaine.

The method of the present invention for making the foregoing composition includes the steps of combining the sulfonated fatty composition, the sulfonated hydroxyaromatic formaldehyde condensation polymer, and water in a vessel to form a reaction mixture, and emulsifying the sulfonated fatty composition and sulfonated hydroxyaromatic formaldehyde condensation polymer in the water. Preferably, the method further comprises the step of polymerizing the sulfonated fatty compound in the reaction mixture. Also, preferably, the sulfonated hydroxyaromatic formaldehyde condensation polymer is present in the reaction mixture in an amount from about 0.5 to about 5 parts by weight per 20 parts by weight of the sulfonated fatty compound. More particularly, the emulsifying step includes the step of adding an emulsifying agent to the reaction mixture. A suitable emulsifying agent is identified above. In addition, the polymerizing step preferably includes the addition of a free radical initiator to the reaction mixture to initiate polymerization and also includes the addition of a chain transfer agent to the reaction mixture to control the molecular weight of the resulting polymer and terminate the polymerization reaction.

More particularly, during polymerization, the reaction mixture is preferably maintained at a temperature within the range from about 20° to about 40° C. for a period from about 2 to about 14 hours.

The method of the present invention for imparting stain resistance to a substrate comprising polyamide linkages includes the step of applying to the substrate the composition of the present invention which comprises sulfonated fatty compound and sulfonated hydroxyaromatic formaldehyde condensation polymer. Preferably, the composition is applied to the polyamide substrate as an aqueous emulsion. When applied to the substrate, the composition preferably has a pH within the range from about 2 to about 3.

The sulfonated fatty compound and sulfonated hydroxyaromatic formaldehyde condensation polymer are preferably added to the polyamide substrate in a combined amount from about 0.5 to about 5% by weight of the substrate. Suitable methods for applying the composition to the substrate include spraying the composition on the substrate, dipping the substrate into the composition, and applying the composition onto the substrate as a foam.

The stain resistant substrates of the present invention comprise polyamide linkages and are coated with the composition of the present invention which includes the sulfonated fatty composition and the sulfonated hydroxyaromatic formaldehyde condensation polymer. The composition is applied as described above. Suitable substrates include fibers, particularly nylon fibers, and carpets made with such fibers. Other suitable substrates include silk, wool, synthetic leather, and natural leather.

DETAILED DESCRIPTION

As described in more detail below, the present invention encompasses a treatment which imparts stain resistance to substrates containing polyamide linkages. The resulting substrates are resistant to staining by acid dyes and tend not to yellow over time when exposed to ultraviolet light or nitrogen dioxide. Suitable substrates include silk, wool, synthetic and natural leather, and nylon fibers. A particularly suitable substrate is nylon fiber carpet. The present invention also encompasses a method for making the stain treatment composition, a method for treating substrates including polyamide linkages with the composition of the present invention, and the resulting treated substrates.

The composition of the present invention includes sulfonated hydroxyaromatic formaldehyde condensation polymer and a sulfonated fatty composition comprising a sulfonated fatty compound including a sulfonated fatty group, the sulfonated fatty group having a carbon chain length of at least $C_{12}$. When applied to a substrate containing polyamide linkages, the sulfonate groups of the components in the composition of the present invention bond to available protonated amino groups on the polyamide substrates and prevent the protonated amino groups from later bonding to acid dyes. Although the sulfonated hydroxyaromatic formaldehyde condensation polymer provides a high level of stain resistance when applied alone to polyamide substrates, when the sulfonated hydroxyaromatic formaldehyde condensation polymer is applied in combination with the sulfonated fatty composition, the coated substrate not only has a high level of stain resistance but also tends not to yellow over time when exposed to ultraviolet light or nitrogen dioxide. Thus, the composition of the present invention is suitable for imparting stain resistance even to light colored and light-shaded substrates such as white or lightly colored nylon fiber carpets.

Suitable sulfonated fatty compounds include sulfonated fatty acids and sulfonated triglycerides. Suitable sulfonated fatty acids include oleic acid, and suitable sulfonated triglycerides are found in marine oil polymers. Suitable marine oils include cod liver oil, menhaden oil, porpoise oil, sperm oil and whale oil. Marine oil is a mixture of triglycerides having highly unsaturated fatty groups that vary considerably in chain length both above and below $C_{18}$, and a considerable amount of triglycerides having saturated fatty groups (up to 25%). Fatty acids such as oleic acid and triglycerides such as those found in marine oil are typically sulfonated by reaction with $SO_3$ to add an $-SO_3H$ group to an unsaturated atom on the molecule. Suitable marine oils include sodium, potassium, and ammonium salts of marine oil. Suitable commercial sulfonated marine oils sold as a sodium salt include Eureka 400-R available from Atlas Refinery, Inc. of Newark, N.J. These materials have approximately 87% solids, between 7 and 13% free fatty acids, a combined $SO_3$ content of 2.3 to 2.5%, and a pH of 5.5 to 6.0. Suitable commercial sulfonated oleic acid includes Eureka 800-R available from Atlas Refinery, Inc. of Newark, N.J. These materials have approximately 65% solids, between 6 and 10% free fatty acids, a combined $SO_3$ content of 1.7 to 2.0%, and a pH of 6 to 7.

Suitable sulfonated hydroxyaromatic formaldehyde condensation polymers include sulfonated phenol formaldehyde condensation polymer and sulfonated dihydroxy diphenyl sulfone formaldehyde condensation polymer. The preparation of condensation polymers of sulfonated aromatic hydroxy compounds with formaldehyde is disclosed in U.S. Pat. No. 4,940,757 to Moss, III, et al., U.S. Pat. No. 1,901,536 to Schafer, U.S. Pat.

No. 1,972,754 to Bierderman, U.S. Pat. No. 1,988,985 to Schafer, U.S. Pat. No. 2,122,361 to Fischer, U.S. Pat. No. 2,17 1,806 to Russell et al., and U.S. Pat. No. 4,680,212 to Blythe, all expressly incorporated herein by reference.

Generally described, sulfonated hydroxyaromatic formaldehyde condensation polymers are made by first sulfonating an aromatic hydroxy compound such as phenol or naphthol, typically with sulfuric acid, and then polymerizing the aromatic compound with formaldehyde under acidic or basic conditions. Hydroxyaromatic formaldehyde condensation polymers are sometimes referred to as novolaks. A suitable sulfonated hydroxyaromatic formaldehyde condensation polymer is Grifftex GD-1.058 available from Grifftex Corporation of Opelika, Ala.

In a preferred embodiment, the composition of the present invention includes water and is in the form of an aqueous emulsion. Preferably, the composition includes an emulsifying agent such as coco-dimethylamido propyl betaine. Such an emulsifying agent is available under the tradename Ethox 2650 and is available from Ethox Chemical of Greenville, S.C.

According to a preferred embodiment, the composition of the present invention can be prepared by free radical polymerization of a sulfonated fatty compound in an aqueous emulsion containing the sulfonated hydroxyaromatic formaldehyde condensation polymer. Preferably, the sulfonated hydroxyaromatic formaldehyde condensation polymer is present in the reaction mixture in an amount from about 0.5 to about 5 pans by weight per 20 pans by weight of sulfonated fatty compound. A suitable emulsification agent is coco-dimethylamido betaine as identified above.

Any free radical initiator can be used that initiates the polymer reaction of the sulfonated fatty compound. Suitable free radical initiators include ammonium persulfate, potassium persulfate, sodium persulfate, hydrogen peroxide and benzoyl peroxide. The free radical initiator is present in the reaction mixture in an amount sufficient to initiate polymeric reaction. A mixture of free radical initiators can also be used to initiate the reaction. The free radical initiators can be activated by any appropriate means for that initiator, including heat, or light.

The reaction mixture can also include agents for enhancing the performance of free radical initiators. For example, ferrous sulfate hepta hydrate is useful to enhance the performance of potassium persulfate.

Chain transfer agents and reducing agents can be used to modulate the molecular weight of the polymer as desired. Suitable chain transfer agents are known to those skilled in the an and include sodium bisulfite formaldehyde.

The free radical polymerization reaction can be carried out in any appropriate solvent, but is preferably carried out in an aqueous medium. The polymerization can be performed at any temperature and at any length of time that produces the desired polymer. The pH of the reaction mixture can be adjusted as desired with any suitable pH agent, including sodium hydroxide, ammonium hydroxide, and potassium hydroxide. Preferably, polymerization includes the steps of maintaining the reaction mixture at a temperature within the range from about 20° to about 40° C. for a period from about 2 to about 14 hours.

The following Examples 1-6 are designed to illustrate particular embodiments of the present invention and teach one of ordinary skill in the art the manner of carrying out the present invention. Comparative Examples 1-3 are designed to demonstrate the advantages of the embodiments illustrated in Examples 1-6.

EXAMPLE 1

A free radical initiator solution comprising 1.41 grams of potassium persulfate, 0.005 grams of ferrous sulfate and 9.8 grams of water was prepared in one container and a chain transfer agent solution comprising 0.25 grams of sodium bisulfite formaldehyde and 0.46 grams of water was prepared in a second container. A reaction vessel equipped with a reflux condenser, mechanical stirrer, and a thermometer was charged with 200 grams of Eureka 400-R sulfonated marine oil (87% solids) available from Atlas Refinery of Newark, N.J., 180 grams of water, 4 grams of Steol CS-460 alcohol ethoxy sulfate (60% solids) available from Stepan of Elwood, Ill., 7 grams Ethox 2650 coco-dimethylamido propyl betaine (99% solids) available from Ethox Chemical of Greenville, S.C., and 11.2 grams of the free radical initiator solution. The contents of the vessel were agitated for five minutes and maintained at 25° to 30° C. throughout the reaction. To this was added 43 grams of Grifftex GD-1058 sulfonated phenol formaldehyde condensate (40% solids) available from Grifftex Corporation of Opelika, Ala. The contents of the vessel were then agitated for 3 minutes after which 4 grams of hydrogen peroxide (30% solution) and 0.7 grams of the chain transfer agent solution were added to the vessel. The contents of the vessel were agitated slowly for 2 hours and then left to stand for 12 hours.

EXAMPLE 2

A stain resistant treatment composition was made according to the procedure described in Example 1 except that the sulfonated phenol formaldehyde condensation polymer was present in an amount of 22 grams and 15 grams of hydroxyethylacrylate and 10 grams of sulfostyrene were added to reaction mixture along with the sulfonated phenol formaldehyde condensation polymer.

EXAMPLE 3

A stain resistant treatment composition was made according to the process described in Example 1 except that the sulfonated phenol formaldehyde condensation polymer was present in an amount of 10 grams and 20 grams of hydroxyethylacrylate was added to the reaction mixture along with the sulfonated phenol formaldehyde condensation polymer.

EXAMPLE 4

A stain resistant treatment composition was made according to the process described in Example 1 except that no Steol CS-460 alcohol ethoxy sulfate was added, the Ethox 2650 coco-dimethylamido propyl betaine was added in an amount of 30 grams, and the sulfonated phenol formaldehyde condensation polymer was added in an amount of 22 grams.

EXAMPLE 5

A stain resistant treatment composition was made according to the process described in Example 1 except that the sulfonated phenol formaldehyde condensation polymer was added in an amount of 60 grams.

EXAMPLE 6

A stain resistant treatment composition was made according to the process described in Example 1 except that the sulfonated phenol formaldehyde condensation polymer was added in an amount of 60 grams, Eureka 800-R sulfonated oleic acid (available from Atlas Refinery of Newark, N.J.) was used in place of Eureka 400-R sulfonated marine oil, and the reaction vessel was charged with 100 grams of water instead of 180.

Comparative Example 1

A composition was made in accordance with the procedure described in Example 4 except that no sulfonated marine oil was added and 402 grams of sulfonated phenol formaldehyde condensation polymer were added.

Comparative Example 2

A composition was made in accordance with the procedure described in Example 4 except that no sulfonated phenol formaldehyde condensation polymer was added.

Comparative Example 3

A composition was made in accordance with the procedure described in Example 6 except that no sulfonated phenol formaldehyde condensation polymer was added.

As discussed above, the stain resistant compositions of the present invention can be applied to substrates containing polyamide linkages such as wool, silk, leather, and nylon. The composition of the present invention is particularly useful for imparting stain resistance to nylon fibers and nylon fiber carpets. The composition of the present invention can be applied to substrates such as textiles by any of the methods known to those skilled in the art for the application of textile treating solutions. Suitable application methods include spraying, dipping, and foaming. For example, the stain resistant composition can be applied to nylon fibers by dipping the fibers in an aqueous exhaust bath such as a beck dye bath or a continuous exhaust system. When applied as a foam, the stain resistant composition includes a suitable amount of a foam generating surfactant. Alteratively, the stain resistant composition of the present invention can be applied in a detergent solution containing nonionic or ionic surfactants, or along with ionic anti-static agents or other water soluble polymers.

The stain resistant composition of the present invention can be applied to the substrate before, during, or after dyeing of the substrate. For application to the substrate, the pH of the stain resistant composition is adjusted to between 1 and slightly below 7, and preferably between 2 and 3, with an acid such as sulfamic, acidic, sulfuric, hydrochloric, formic, or citric acid.

After application of the stain resistant composition, the substrate is rinsed with water and the stain resistant formulation is fixed with moist or dry heat. After the stain resistant formulation is fixed, the substrate is dried such as by passing the substrate through an aerated oven at an elevated temperature of about 90° C.

The stain resistant composition of the present invention is applied at any weight on the surface of the substrate that provides adequate performance. Preferably, the combination of the sulfonated fatty compound and the sulfonated hydroxyaromatic formaldehyde condensation polymer is added to the polyamide substrate in an amount from about 0.5 to about 5% by weight of the substrate, and more preferably, from about 1 to about 3% by weight of the substrate. The amount of the composition to be applied varies based on many factors known to those skilled in the art including dyeability of the substrate, crystallinity of the polyamide, and the type of substrate. In general, nylon 6 fibers require more stain resistant composition than nylon 6,6 fibers to achieve the same performance level. Further, fibers that have been heat set under moist conditions usually require more stain resistant composition than fibers heat set under dry conditions. The amount of stain resistant composition to be used is also determined in part by the cost effectiveness of a composition.

The stain resistant composition of the present invention can be applied in combination with other treatments. For example, the stain resistant performance of the composition of the present invention can be improved by applying a fluorochemical coating to the substrate. Suitable fluorochemical coatings include Scotchguard ® 358 and 352 available from Minnesota Mining and Manufacturing Company; Zepel ® and Teflon ® Toughcoat available from E. I. Dupont de Nemours & Company; Milease F-86 available from ICI Americas, Inc.; Aurapel FC-340 and 342 manufactured by Auralux Corporation; NK Guard FG 280 available from NICCA Chemicals and Glo Guard CFC available Glo-Tex Chemicals. The fluorochemical can be applied to the substrate either before, during, or after treatment with the stain resistant composition of the present invention. Methods for applying fluorochemical coatings are known to those skilled in the art, and are described in a number of patents, including U.S. Pat. No. 4,619,853 to Blythe, U.S. Pat. No. 4,388,372 to Champameria, U.S. Pat. No. 4,839,212 to Blythe et al., U.S. Pat. No. 4,680,212 to Blythe et al., all of which are expressly incorporated herein by reference.

In addition, an antimicrobial compound or combination of compounds can be added to the fluorocompound. Examples of antimicrobial compounds that can be included in the coating include OBPA (10,10'-oxybisphenarsine), marketed under the name Vinyzene BP-505 DOP by Morton Thiokol, Inc.; silicone quaternary ammonium salts such as Sylgard, manufactured by Dow Corning Corporation; and monoesters of phosphoric acid or its salt, preferably the di(2-hydroxyethyl) coco-amine salt of 2-ethylhexylphosphoric acid, as described in U.S. Pat. No. 4,935,232, entitled "Microbiocidal Composition and Method of Preparation Thereof."

Nylon fiber carpet samples were treated with compositions from Examples 1-6 and Comparative Examples 1-3. The treated carpet specimens were tested for stain resistance and for light fastness which is a test for discoloration (yellowing). The results of these tests are shown in Table 1 below. The following procedure was used for treating carpet specimens with the compositions from Examples 1-6 and Comparative Examples 1-3:

A treating solution was prepared containing 12 grams (40% solids) of the stain treatment composition from the example in 750 milliliters of water. The solution was adjusted to a pH of 2 with citric acid. A 12×9" specimen of nylon 6 carpeting was immersed in the treating solution for one minute at ambient temperature then removed. The carpet specimen was then steamed for 2 minutes, after which the carpet was then squeezed through rollers followed by a cold water rinse. This cycle was repeated four times. The carpet specimen was then dried in an aerated oven at approximately 90° C. A 6 inch square piece was cut from each treated carpet specimen for stain resistance testing and the remainder of the carpet specimen was tested for light fastness.

The stain resistance testing was conducting in accordance with AATCC 175-1991. A stain solution was prepared by dissolving 100±1 mg of FD&C red dye 40 in 1 liter ±10 ml of distilled water. The pH of this solution was adjusted to 2.8±0.1 with citric acid (approximately 3.2 grams). Each carpet specimen was placed on a flat non-absorbent surface at 21±1° C. A 5 centimeter diameter piece of pipe was place in the center of the test specimen with the open end of the pipe against the test specimen. While pressing down on the pipe, 20 milliliters of the staining solution was poured into the center of the pipe. A piston was pressed into the carpet pile to force the staining solution into the carpet. The staining pipe and piston were carefully removed.

The stained specimens were cut into three pieces, left for 1, 8, and 24 hours, respectively, in a flat position, pile side up, at 21° C., and then rinsed under running cold water until all unfixed red dye was removed. Each wet piece of carpet was vacuumed to extract excess water and then dried in an aerated oven at approximately 100° C. The stain resistance of each carpet piece was rated from 1–10 using the AATCC red 40 stain scale, wherein the grade of 1 is severe staining and 10 is no staining.

The color fastness to light (light fastness) of the specimens treated with the compositions from Examples 1–6 and Comparative Examples 1–3 was evaluated using the AATCC test method described in the publication "Color Fastness to Light: Water-Cooled Xenon-arc Lamp, Continuous Light" 1989 version. The carpet specimens treated with the stain resistant compositions from Examples 1–6 and Comparative Examples 1–3 were compared to a control carpet specimen which was untreated and unstained. The carpet specimens were compared using the scale 1–5, wherein 5 indicates no discoloration and 1 indicates severe discoloration.

TABLE 1

| Stain Resistant Composition | Sul. Fatty Comp. (grams) | Sul. Phenol Form. Poly. (grams) | Ratio | Stain Resistance | | | Light Fastness |
|---|---|---|---|---|---|---|---|
| | | | | 1 Hr. | 8 Hr. | 24 Hr. | |
| Example 1 | 200 | 43 | 2.0 | 8 | 7 | 6 | 3 |
| Example 2 | 200 | 22 | 1.0 | 7 | 7 | 7 | 4 |
| Example 3 | 200 | 10 | 0.5 | 7 | 6 | 5 | 4 |
| Example 4 | 200 | 22 | 1.0 | 8 | 8 | 7 | 4 |
| Example 5 | 200 | 60 | 2.8 | 9 | 9 | 8 | 2 |
| Example 6 | 200 | 60 | 3.7 | 10 | 9 | 9 | 4 |
| Comparative Example 1 | 0 | 402 | — | 10 | 9 | 9 | 1 |
| Comparative Example 2 | 200 | 0 | — | 5 | 5 | 4 | 4 |
| Comparative Example 3 | 200 | 0 | — | 6 | 6 | 5 | 5 |

In Table 1, the Ratio refers to parts of sulfonated phenol formaldehyde condensate polymer per 20 parts of the sulfonated fatty compound. This is calculated based on the solids content of the starting materials. For example, the Ratio for Example 1 is calculated as follows:

$$20 \times (43 \times 0.4)/(200 \times 0.87) = 2.0$$

As can be seen from Table 1, the composition of Comparative Example 1, wherein no sulfonated fatty composition was used, exhibited good stain resistance but poor light fastness. Meanwhile, the compositions from Comparative Examples 2 and 3, which contained sulfonated marine oil and sulfonated oleic acid, respectively, but no sulfonated phenol formaldehyde condensate polymer, exhibited good light fastness but poor stain resistance. In contrast, the compositions from Examples 1–6, illustrating embodiments of the present invention, exhibited a good combination of stain resistance and light fastness. The composition of Example 6 comprising sulfonated phenol formaldehyde condensation polymer and sulfonated oleic acid exhibited a particularly good combination of stain resistance and light fastness. In Examples 2 and 3, additional monomers were added (hydroxyethylacrylate and sulfostyrene) in an attempt to increase the stain resistance of the compositions but no improvement was noted.

It should be understood that the foregoing only relates to preferred embodiments of the present invention and that numerous changes and modifications may be made therein without departing from the spirit and scope of the invention as defined by the following claims.

We claim:

1. Composition for providing stain resistance comprising:
   sulfonated hydroxyaromatic formaldehyde condensation polymer; and
   a sulfonated fatty composition comprising a polymerized sulfonated fatty compound including a sulfonated fatty group, the sulfonated fatty group having a carbon chain length of at least $C_{12}$.

2. Composition as in claim 1 wherein the sulfonated hydroxyaromatic formaldehyde condensation polymer is present in an amount from about 0.5 to about 5 parts by weight per 20 parts by weight of the sulfonated fatty compound.

3. Composition as in claim 1 wherein the sulfonated hydroxyaromatic formaldehyde condensation polymer is selected from the group consisting of sulfonated phenol formaldehyde condensation polymer and sulfonated dihydroxy diphenyl sulfone formaldehyde condensation polymer.

4. Composition as in claim 1 wherein the sulfonated fatty compound is a sulfonated fatty acid.

5. Composition as in claim 1 wherein the sulfonated fatty compound is a sulfonated triglyceride.

6. Composition as in claim 5 wherein the sulfonated fatty composition comprises sulfonated marine oil, the sulfonated marine oil comprising the sulfonated triglyceride.

7. Composition as in claim 6 wherein the sulfonated marine oil is selected from the group consisting of sulfonated cod liver oil, menhaden oil, porpoise oil, sperm oil, and whale oil.

8. Composition as in claim 1 further comprising water.

9. Composition as in claim 8 further comprising an emulsifying agent.

10. Composition as in claim 9 wherein the emulsifying agent comprises coco-dimethylamido propyl betaine.

11. Composition as in claim 6 wherein the sulfonated hydroxyaromatic formaldehyde condensation polymer is present in an amount from about 0.5 to about 5 parts by weight per 20 parts by weight of sulfonated marine oil, and the composition further comprises water and an emulsifying agent.

12. Composition for providing stain resistance comprising: sulfonated hydroxyaromatic formaldehyde condensation polymer; and sulfonated oleic acid.

13. Composition as in claim 12 wherein the sulfonated oleic acid is polymerized.

14. Composition as in claim 12 wherein the sulfonated hydroxyaromatic formaldehyde condensation polymer is present in an amount from about 0.5 to about 5 parts by weight per 20 parts by weight of sulfonated oleic acid, and the composition further comprises water and an emulsifying agent.

15. Composition for providing stain resistance comprising: sulfonated hydroxyaromatic formaldehyde condensation polymer; and polymerized sulfonated marine oil.

* * * * *